(12) United States Patent
Wilson et al.

(10) Patent No.: US 8,286,789 B2
(45) Date of Patent: Oct. 16, 2012

(54) TWO-PIECE PROTECTIVE CARRYING CASE

(75) Inventors: Scott Wilson, Chicago, IL (US); Dustin Brown, Chicago, IL (US); Jon Godston, Chicago, IL (US)

(73) Assignee: Uncommon LLC, Chicago, IL (US)

( * ) Notice: Subject to any disclaimer, the term of this patent is extended or adjusted under 35 U.S.C. 154(b) by 0 days.

(21) Appl. No.: 12/855,311

(22) Filed: Aug. 12, 2010

(65) Prior Publication Data

US 2011/0049005 A1    Mar. 3, 2011

Related U.S. Application Data

(60) Provisional application No. 61/233,146, filed on Aug. 12, 2009.

(51) Int. Cl.
*B65D 85/00* (2006.01)
*B65D 85/30* (2006.01)
(52) U.S. Cl. ...................................................... 206/320
(58) Field of Classification Search .................. 206/305, 206/320, 701, 521; 220/8; 361/679.3, 679.4, 361/679.41, 679.56; 455/575.1, 575.4, 575.8; 379/433.11, 433.12; D3/218
See application file for complete search history.

(56) References Cited

U.S. PATENT DOCUMENTS

| 3,397,814 | A | * | 8/1968 | Zackheim | 220/792 |
| 5,368,159 | A | * | 11/1994 | Doria | 206/320 |
| D582,149 | S | * | 12/2008 | Tan | D3/218 |
| 7,612,997 | B1 | * | 11/2009 | Diebel et al. | 361/679.56 |
| 7,930,011 | B2 | * | 4/2011 | Shi et al. | 455/575.8 |
| 7,933,122 | B2 | * | 4/2011 | Richardson et al. | 361/679.55 |
| 2009/0032421 | A1 | * | 2/2009 | Sween et al. | 206/320 |
| 2009/0114556 | A1 | * | 5/2009 | Tai et al. | 206/320 |
| 2010/0096284 | A1 | * | 4/2010 | Bau | 206/320 |

* cited by examiner

*Primary Examiner* — Luan K Bui
(74) *Attorney, Agent, or Firm* — Bishop & Diehl, Ltd.

(57) ABSTRACT

A carrying case for a portable device is disclosed. Generally speaking, the protective case for a portable device comprises a first body section and a second body section, each having a back surface and upturned sides, and a rim affixed to an edge of the upturned sides of the body sections, the rim defining an open area. Preferably, the first and second body sections are of contrasting colors and connect to one another to form a cavity defined by the respective back surfaces and upturned sides. Further, the first and second body sections and the first and second rim are preferably all formed of the same material.

18 Claims, 6 Drawing Sheets

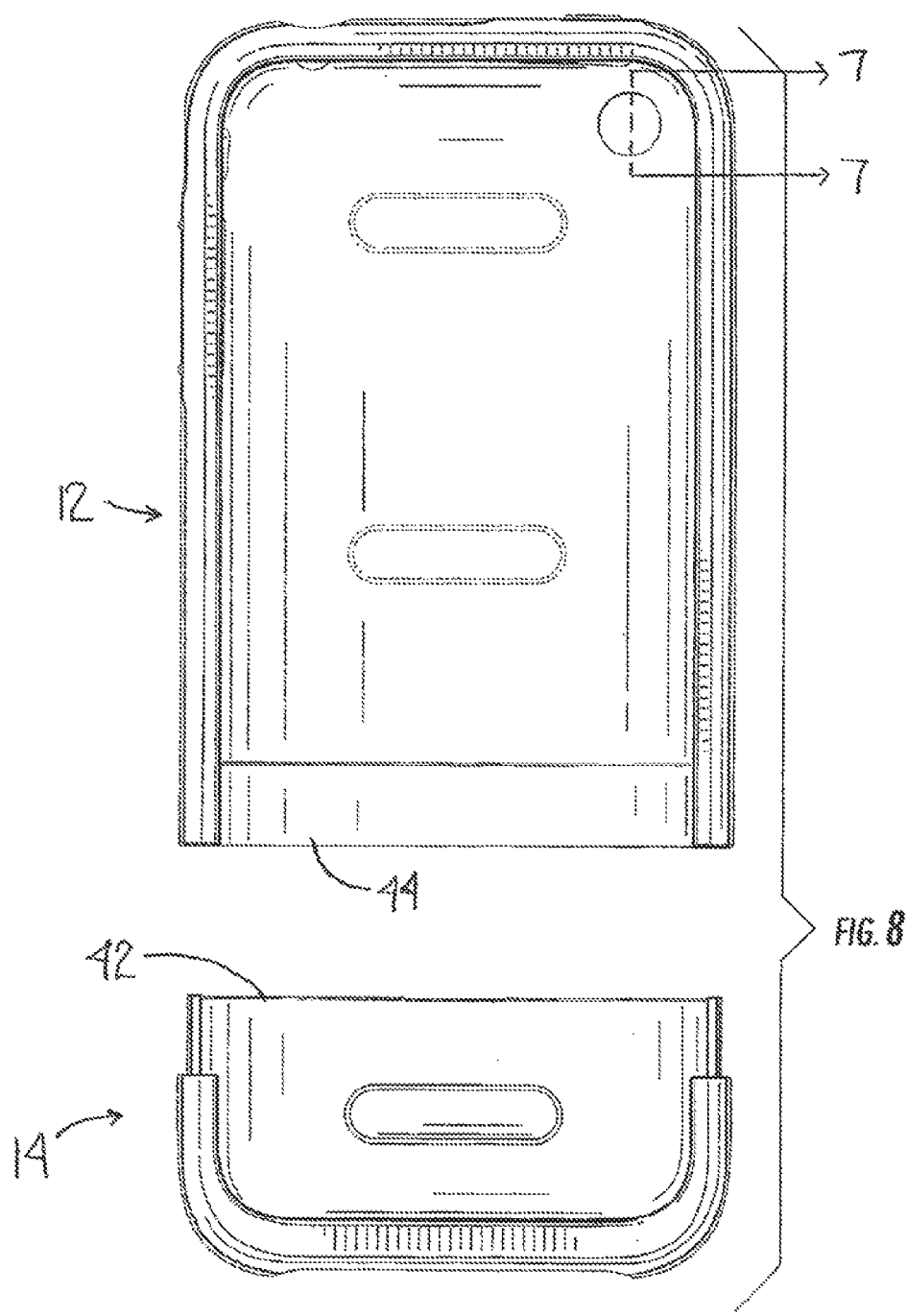

TWO-PIECE PROTECTIVE CARRYING CASE

RELATED APPLICATIONS

The present application claims the filing priority of, and incorporates herein by reference, Provisional Application No. 61/233,146, filed on Aug. 12, 2009.

TECHNICAL FIELD

The present invention relates to electronic device cases, and more specifically to thermoformed protective cases formed with two-piece resins to ensure high quality registration of features on one or both sides of the item.

BACKGROUND OF THE INVENTION

Previously, to produce thermoformed items having details disposed on one or both sides of the item, using a plastic or other suitable material, required the use of different and multiple molding processes. For example, a sheet of material or fluid material from which an item was to be formed might be initially positioned within or directed into an injection or compression molding device in order to create detail or features required on at least one side of the item. Subsequently, the material sheet would then be positioned or run through a suitable second thermoforming device to complete the formation of the item from the material. The resulting thermoformed item might then be heat treated under vacuum conditions with a dye printing sheet to print a pre-drawn design onto a surface of the item.

However, these multi-step processes have a number of significant drawbacks. First, the added steps typically slow production time and increase production cost. Second, subjecting the item to repeated high-temperature steps can have a detrimental effect on the item.

As to the first point, to initially print the detailed design on the thermoformed item, the process may require both a detail molding device and step, which can be either an injection molding step or a compression molding step, as well as a final thermoforming step (e.g., melting or sublimation techniques) used to create the final form for the item. Finally, the pre-drawn design needs to be imprinted to the item. The multiple steps and molding devices required for each step significantly increases the complexity of the process and the costs for producing the final item with an image or design printed thereon.

Of no less importance is the integrity of the final item. That is, when a sheet of material is positioned within the heat treatment device to finalize the transfer of the dye printing onto the item, often times the process results in a partial or complete deformation or destruction of the original detail from the initial thermoforming steps. That is, due to the repeated use of high-temperatures necessary to initiate transfer of the dye from a pre-printed film to one or both sides of the thermoformed item, the edges around the item may be unable to withstand such heat for the required duration of the transfer process. However, shortened heat transfer times would fail to ensure consistent transfer of the dye on the entire surface of the item. Thus, the resulting item may often be undesirable or unusable for its intended purpose due to the damage done to the thermoform details on the item.

Therefore, it is desirable to develop a device and method for thermoforming an item which is capable of effectively transferring the image from the printing sheet to a surface of the item in a single step utilizing only the thermoforming device

SUMMARY OF THE INVENTION

There is disclosed herein an improved protective carry case for a device, such as a portable electronic device (e.g., a phone, camera, PDA, etc.) which avoids the disadvantages of prior devices while affording additional structural and operating advantages.

Generally speaking, the protective case for a portable device comprises a first body section and a second body section, each having a back surface and upturned sides, and rim affixed to an edge of the upturned sides of the body sections, the rim defining an open area. Preferably, the first and second body sections are of contrasting colors and connect to one another to form a cavity defined by the respective back surfaces and upturned sides. Further, the first and second body sections and the first and second rim are preferably all formed of the same material.

It is a further aspect of an embodiment of the invention to provide at least one integral toggle button cover positioned on an upturned side of one of either the first body section or the second body section.

It is another aspect of an embodiment of the invention to provide at least one stop on the inner surface of the case for frictionally engaging another surface, such as that of the portable device to be encased. In the event a camera or other sound or image recording device is provided by the portable device, it is an aspect of an embodiment of the invention to provide a passage having an opening on each of the back surface and the inner surface of one of either the first body section or the second body section, the openings being connected by a sidewall. The sidewall is preferably slanted outward to lessen possible interference with the image and/or sound recording function.

These and other aspects of the invention can be more readily understood from a reading of the following detailed description accompanied by the appended drawing figures.

BRIEF DESCRIPTION OF THE DRAWINGS

The invention may be better understood with reference to the following drawings. The components in the drawings are not necessarily to scale, emphasis instead being placed upon illustrating the principles of the invention. In the drawings, like reference numbers designate corresponding parts throughout.

FIG. 9 is an enlarged side exploded view of the portable carrying case device of FIG. 8.

DETAILED DESCRIPTION OF THE INVENTION

Figure 1:
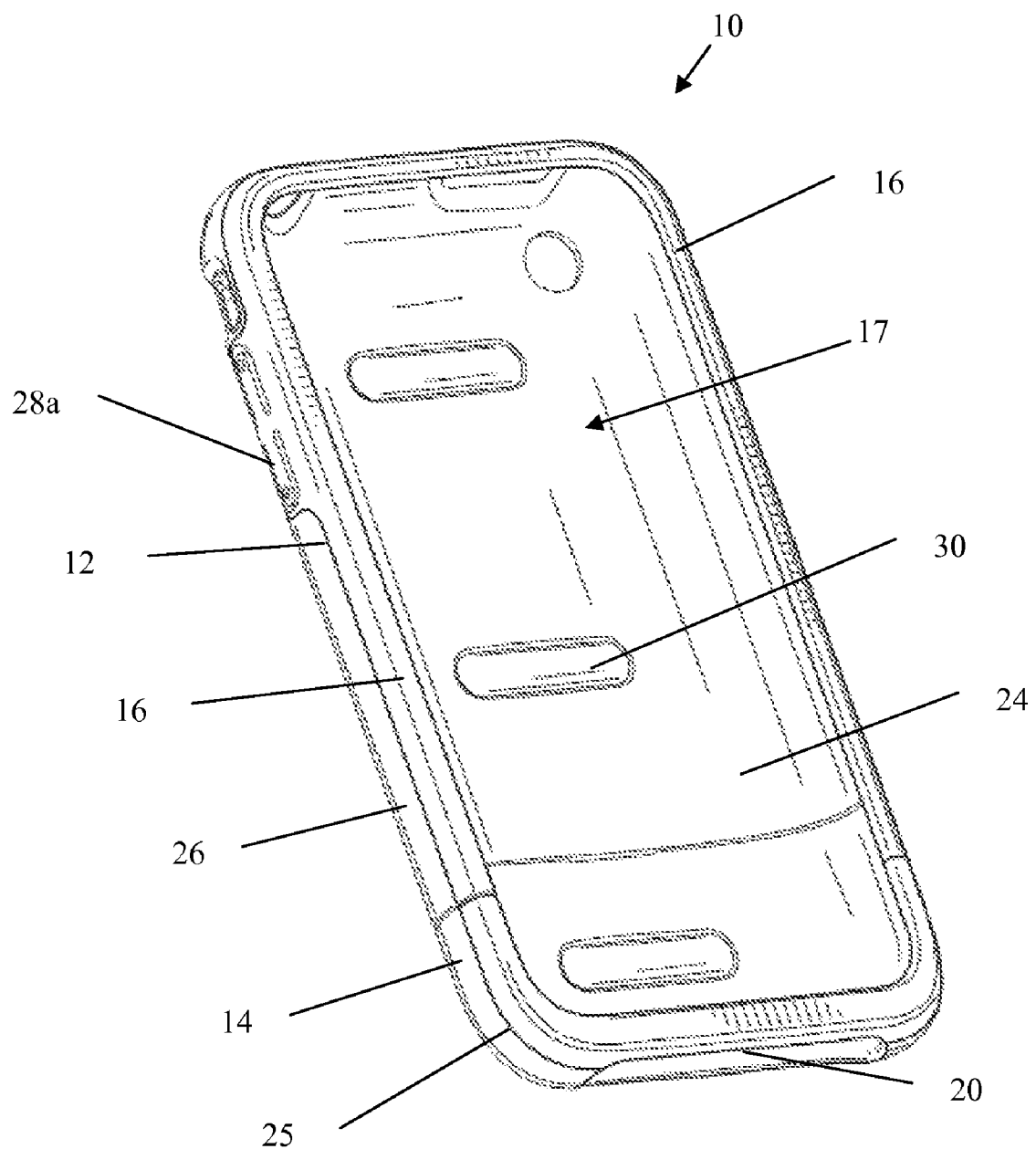
FIG. 1 is a perspective front view of an embodiment of a portable carrying case device in accordance with the present invention.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to embodiments illustrated.

Referring to FIGS. 1-9, there is illustrated an embodiment of a protective carrying case, generally designated by the number 10, for a portable electronic device. The particular illustrated embodiment is representative of a carrying case designed for an iPhone, manufactured by Apple, Inc. However, a carrying case 10 made in accordance with the present invention may be configured to fit any number of portable electronic devices, including other smart phones, PDA devices, calculators, cameras, global positioning system (GPS) devices, and the like. Those skilled in the relevant art will be able to understand and provide the required design changes to accommodate such alternate devices after a reading of the present detailed disclosure, including the appended drawing figures, without need for undue experimentation.

Reference numbers used within FIGS. 1-9 and in the detailed description to follow, correspond as shown to the following elements:

| Reference Number | Element |
| --- | --- |
| 10 | protective carrying case; |
| 12 | first body section; |
| 14 | second body section; |
| 16 | rim; |
| 17 | open area; |
| 18 | back surface; |
| 20 | bottom opening; |
| 22 | cavity; |
| 24 | inner surface; |
| 25 | edge; |
| 26 | upturned side; |
| 28a/28b | toggle button cover; |
| 30 | friction stop; |
| 32 | conical passage; |
| 34 | passage sidewall; |
| 36 | opening, inner surface |
| 38 | opening, back surface |
| 42 | extended flange; and |
| 44 | receptacle. |

With reference to the illustrated embodiment, a protective carrying case 10 includes a first body section 12 and a second body section 14. The first body section 12 and the second body section 14 are preferably formed of high-strength thermoplastic polymers such as ABS and polycarbonate materials known in the art. Each of the first and second body sections, 12 and 14, has a back surface 18 which transforms along an edge 25 into upturned sides 26. The edge 25 is preferably radiused to provide a smooth transition from back surface 18 to sides 26. However, the edge 25 may be in the form of a traditional 45 degree corner, or some variation, as well. When the two sections 12, 14 are connected together, a cavity 22 is formed as defined by an inner surface 24 of the body sections, 12, 14, and the upturned sides 26.

The first body section 12 also includes at least one integral toggle button cover 28 for aligning with control switches on the encased electronic device (not shown), such as for volume and on/off buttons. Toggle button covers 28 are preferably positioned within the upturned side 26 of either the first body section 12, the second body section 14, or both. In the illustrated embodiment, a volume toggle button cover 28a is positioned on a left or right side of the first body section 12 and an on/off toggle button cover 28b is positioned on a topside of the first body section 12. Additional toggle button covers may be used to suit the various configurations of other electronic devices.

Figure 2:
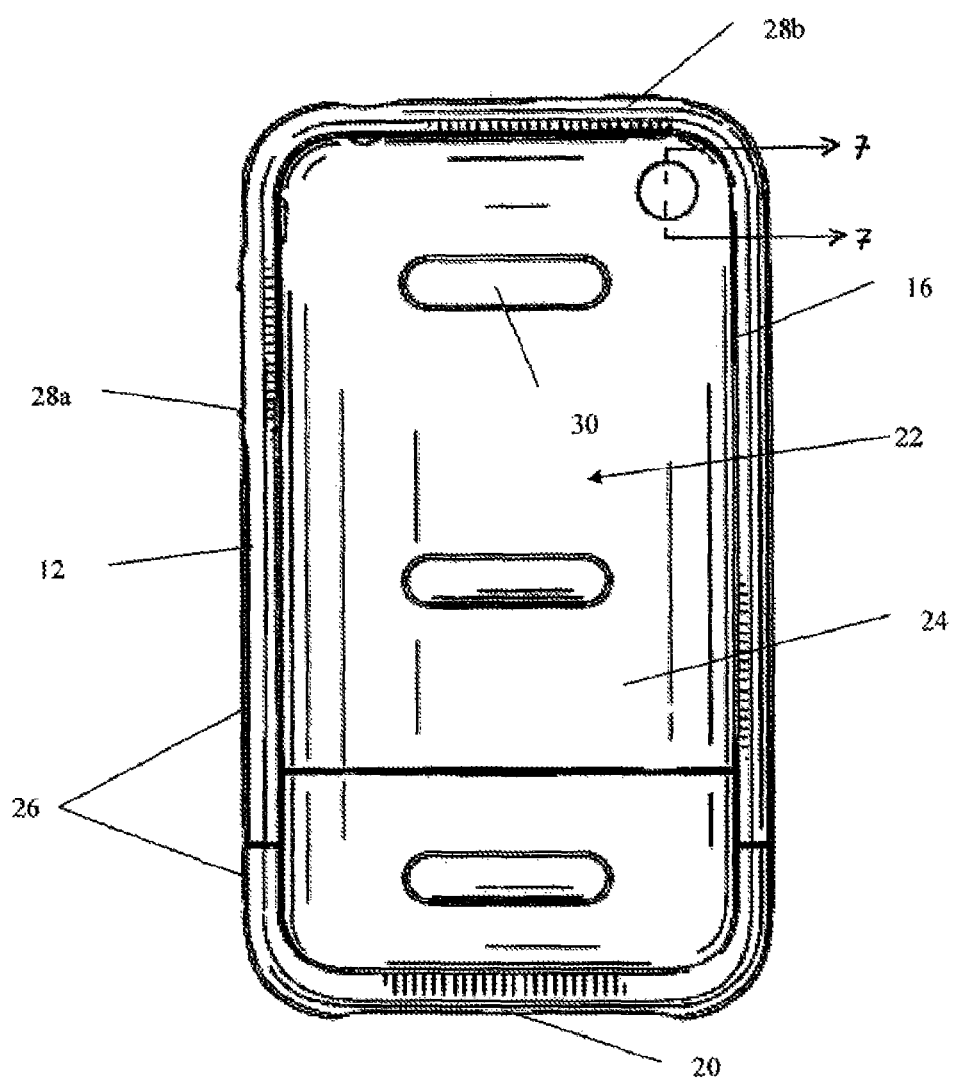
FIG. 2 is a front view of the portable carrying case device shown in the drawing of FIG. 1 and made in accordance with the present invention.
Figure 3:
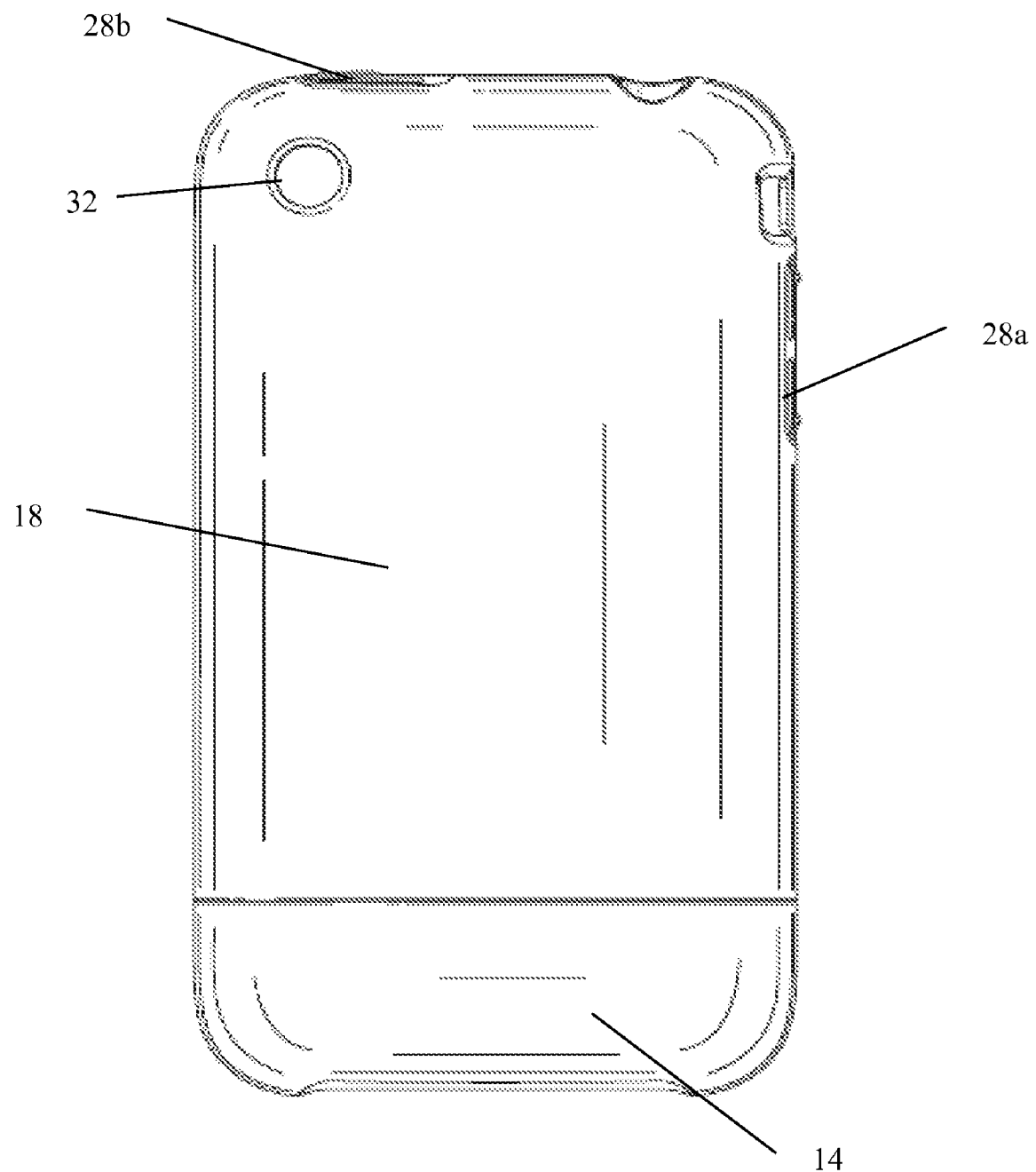
FIG. 3 is a back view of the portable carrying case device shown in the drawing of FIG. 1.
Figure 4:
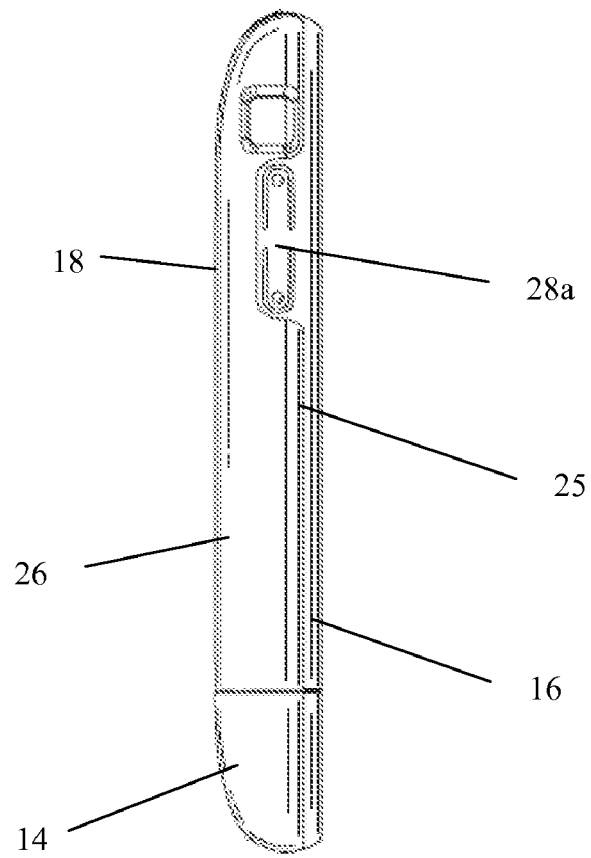
FIG. 4 is an enlarged side view of the portable carrying case device shown in the drawing of FIG. 1.
Figure 5:
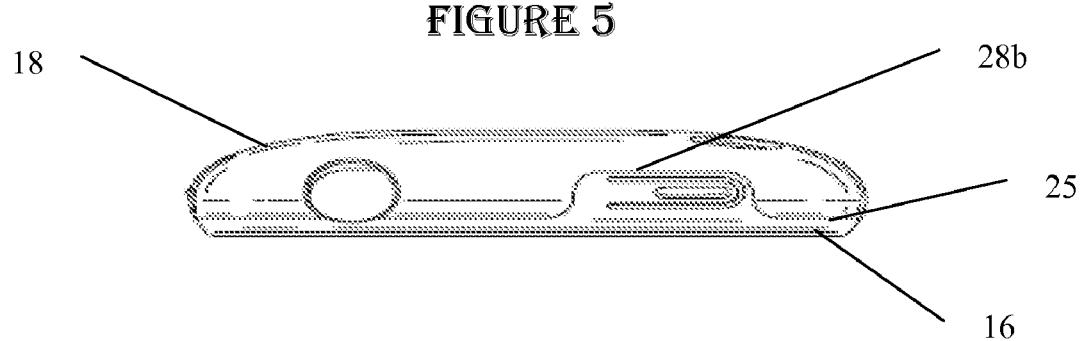
FIG. 5 is an enlarged top view of the portable carrying case device shown in the drawing of FIG. 1.
Figure 6:
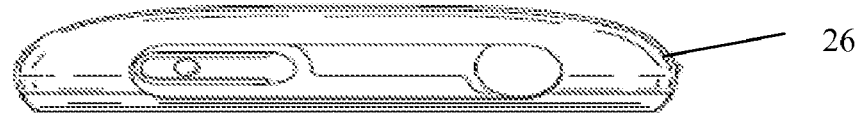
FIG. 6 is an enlarged bottom view of the portable carrying case device of FIG. 1.
Figure 8:
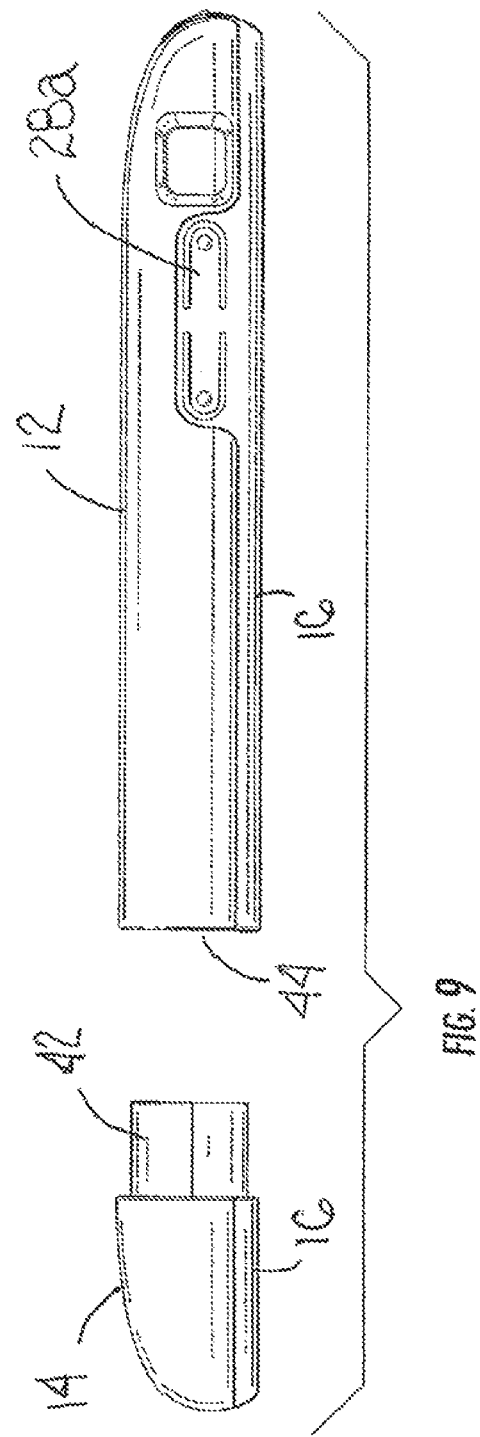
FIG. 8 is an enlarged front exploded view of the portable carrying case device of FIG. 1.

As shown best in FIGS. 2 and 8, a rim 16 is affixed to an edge of the upturned side 26 of both the first body section 12 and the second body section 14. The rim 16 provides a slight overhang to the cavity 22 to facilitate securing an electronic device within the carrying case. The rim 16 frames an open area 17 where typically display and/or keyboard functions are located.

The inner surface 24 of the case 10 may include a plurality of stops 30 for frictionally engaging an outer surface of an electronic device. The stops 30 are preferably comprised of a high-friction material, such as a rubber or other suitable polymer. In the preferred embodiment, for ease of placement, the stops 30 are substantially clear, dome-shaped decals which adhere to the inner surface 24 by any suitable adhesive. As shown, the stops 30, of which there are three, are horizontally located in an aligned arrangement on the inner surface 24 of the two-piece body sections 12, 14 to provide an overall, balanced engagement of the device. That is, the number and positioning of the stops 30 allows a portable electronic device (not shown) to be held securely after being slidably pushed into the case 10.

Another contemplated use for the inner surface 24 of the first body section 12 or the second body section 14 is as advertising space. For example, corporate logos, brand names and the like may be incorporated into the mold tooling.

With reference to FIGS. 8 and 9, the connection between the first body section 12 and the second body section 14 can be more readily understood. The second body section 14 includes an extended flange 42, while the first body section 12 includes a corresponding receptacle 44. After an electronic device is placed into the first body section 12, the flange 42 of the second body section 14 inserts into the receptacle 44 of the first body section 12 as the second body section is slid onto the device. The flange 42 and receptacle 44, which may be switched on the two bodies, mate frictionally to hold the first and second body sections, 12 and 14 about the device in a protective manner. Using similar polycarbonate material for the first body section 12 and the second body section 14 enables an exceptionally strong frictional engagement between the two bodies.

Further, it is also contemplated that the first body section 12 and the second body section 14, may be provided with contrasting colors to mask overprinting. Preferably, the first body section 12 is provided in black and the second body section 14 is provided in white. If ink is printed, for example, over the white section and overprints to the black section, the ink will not show on the black. The effect will be a clean line at the junction of the two colors. It will be understood that any contrasting color can be applied to the first body section 12 and the second body section 14 to accomplish the intended goal of the present invention.

As mentioned above, it has been determined that many materials, particularly plastics, are unable to withstand repeated high temperatures (e.g., 160° C. and up) for the required duration of the transfer process. For example, during a thermo transfer process wherein the dye from the pre-printed film is introduced to the second body section 14, the dye may not be consistently transferred onto the entire second body section 14. In fact, it is not uncommon for the edge 25 of the second body section 14 which corresponds and aligns with the edge 25 of the first body section 12, to be susceptible to deformation at high temperatures. As a result, the quality of the transferred dye on the first body section 12 or the second body section 14 of the carrying case 10 may be functionally or aesthetically undesirable and even come off.

However, the rim 16 is tightly bonded to both body sections, 12 and 14, which accomplishes at least a few goals of embodiments of the present invention. First, the rim 16 creates a perfect line about the open area 17 much like the contrasting colors of the two sections, as described above. Second, the rim 16 is also able to mask many physical imperfections in the edge 25 as a result of the ink heat transfer (e.g., sublimation process). The rim 16 may also provide structural support to the case in many instances.

Therefore, it is preferably contemplated that the rim 16 affixed to both the first body section 12 and the second body section 14 is integrally bonded in either an injection molding or compression molding process. This subsequent bonding of the rim along an edge 25 of the upturned sides 26 of the first and second body sections, 12 and 14, ensures that any loosely transferred dye along this area of the first and second body sections 12, 14 is masked by the rim 16.

The use of visually contrasting colors or shades between the first body section 12 and the second body section 14 may have other additional benefits. For example, the contrasting color of the first body section 12 and the second body section 14, coupled with side toggle button cover 28 and a bottom opening 20 to accommodate a charging plug adapter, provides a user with a visual indication to confirm proper orientation of the housing. Further, the contrasting body sections can be used to indicate proper holding orientation of the device and to enhance visibility of the device. Alternatively or additionally, indicia may be printed on the back surface 18 of the case 10 or on the inner surface 24 of either body section 12, 14 to indicate proper orientation. Finally, the use of contrasting shades or colors between the two body sections 12, 14 provides the visual impression that the housing is thinner than other similar cases in the market used to protect a portable electronic device.

Figure 7:
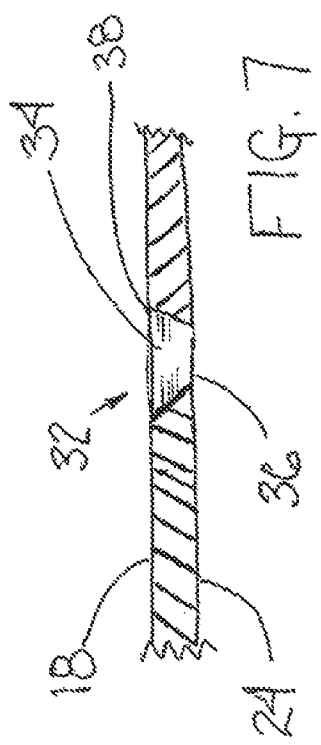
FIG. 7 is a partial cross-section of an embodiment of the passage provided to align with a camera feature (e.g., lens) on an electronic device as seen from cross-sectional line 7-7 in FIG. 2.

Referring to FIG. 7, another optional feature of the present case 10, conical passage 32, can be seen. The conical passage 32 is used to align with the electronic device's camera lens feature. As such, the conical passage 32 is preferably positioned on the back surface 18 of the case 10 in either the first body section 12 or the second body section 14. The passage 32 has an opening at each of the back surface 18 and the inner surface 24 of the case. A slanted sidewall 34 connects the two openings. Preferably, the inner surface opening 36 has a diameter less than the back surface opening 38. This configuration provides that a greater amount of light will be able to enter the camera aperture for better quality pictures. The conical sidewall 32 also prevents a photo "flash" effect prevalent in devices using tubular passages where indirect light reflects from the sidewall to "wash-out" a portion of the photo.

It should be emphasized that the above-described embodiments of the present invention, particularly, any "preferred" embodiments, are possible examples of implementations merely set forth for a clear understanding of the principles for the invention. Many variations and modifications may be made to the above-described embodiment(s) of the invention without substantially departing from the spirit and principles of the invention. All such modifications are intended to be included herein within the scope of this disclosure and the present invention, and protected by the following claims.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A protective case for a portable device, the case comprising:
    a first body section formed of a first material and having a back surface extending the full width and length of the first body section, and upturned sides;
    an image transferred onto at least a portion of the first body, including the upturned sides;
    a distinct first rim tightly bonded to an edge of the separately formed upturned sides of the first body section to mask imperfections at the edge caused by the image being transferred, the first rim defining an open area and formed of a second material;
    a second body section formed of the first material and having a back surface extending the full width and length of the second body section, and upturned sides;
    an image transferred onto at least a portion of the second body, including the upturned sides;
    a distinct second rim tightly bonded to an edge of the separately formed upturned sides of the second body section to mask imperfections at the edge caused by the image being transferred, the second rim defining an open area and formed of the second material; and
    at least one toggle button area integrally formed with at least one of either the first and second rims;
    wherein the first and second body sections connect to one another to form a cavity defined by the respective back surfaces and upturned sides.

2. The protective case of claim 1, wherein the first material and the second material are the same material.

3. The protective case of claim 1, further comprising at least one integral toggle button cover positioned on an upturned side of the first body section.

4. The protective case of claim 1, further comprising at least one integral toggle button cover positioned in at least one of either the first body section, the second body section, or both body sections.

5. The protective case of claim 1, further comprising an inner surface within the cavity, the inner surface having at least one stop for frictionally engaging another surface.

6. The protective case of claim 5, wherein the inner surface has at least one stop for frictionally engaging another surface on each of the first body section and the second body section.

7. The protective case of claim 1, wherein the second body section and the first body section have contrasting colors.

8. The protective case of claim 2, wherein the second body section and the first body section have contrasting colors.

9. The protective case of claim 1, further comprising a passage having an opening on each of a back surface and an inner surface, the openings being connected by a sidewall and the passage being positioned on one of either the first body section or the second body section.

10. The protective case of claim 9, wherein the passage opening on the back surface has a diameter greater than a diameter of the passage opening on the inner surface.

11. The protective case of claim 9, wherein the passage sidewall is sloped inward from the opening on the back surface to the opening on the inner surface.

12. The protective case of claim 5, further comprising a passage having an opening on each of the back surface and the inner surface of one of either the first body section or the second body section, and a sidewall connecting the openings.

13. The protective case of claim 12, wherein the passage sidewall is sloped inward from the opening on the back surface to the opening on the inner surface.

14. The protective case of claim 12, wherein the passage opening on the back surface has a diameter greater than a diameter of the passage opening on the inner surface.

15. A protective case for a portable device, the case comprising:
- a first body section having a back surface and upturned sides;
- an image transferred to the first body section, including the upturned sides;
- a first rim affixed to an edge of the upturned sides of the first body section to mask imperfections at the edge, the first rim defining an open area;
- a second body section having a back surface and upturned sides;
- an image transferred to the second body section, including the upturned sides;
- a second rim affixed to an edge of the upturned sides of the second body section to mask imperfections at the edge, the second rim defining an open area, wherein the first and second body sections are of contrasting colors and connect to one another to form a cavity defined by the respective back surfaces and upturned sides, and the first and second body sections and the first and second rim are all formed of the same material;
- at least one integral toggle button cover positioned on an upturned side of one of either the first body section or the second body section;
- an inner surface within the cavity, the inner surface having at least one stop for frictionally engaging another surface; and
- a passage having an opening on each of the back surface and the inner surface of one of either the first body section or the second body section, the openings being connected by a sidewall.

16. The protective case of claim 15, wherein the passage sidewall is sloped inward from the opening on the back surface to the opening on the inner surface.

17. The protective case of claim 15, wherein the passage opening on the back surface has a diameter greater than a diameter of the passage opening on the inner surface 18. The protective case of claim 15, wherein the first rim and the second rim are a single piece.

* * * * *